United States Patent [19]

Uchida

[11] Patent Number: 5,037,688

[45] Date of Patent: * Aug. 6, 1991

[54] MATERIAL FOR PROTECTING A SLOPE SURFACE AND FOR WATER TREATMENT AND CONTACT PURPOSES

[75] Inventor: Hiroshi Uchida, Ashikaga, Japan

[73] Assignee: Earthnics Corporation, Tokyo, Japan

[*] Notice: The portion of the term of this patent subsequent to Apr. 4, 2006 has been disclaimed.

[21] Appl. No.: 910,094

[22] PCT Filed: Jan. 14, 1986

[86] PCT No.: PCT/JP86/00013

§ 371 Date: Sep. 12, 1986

§ 102(e) Date: Sep. 12, 1986

[87] PCT Pub. No.: WO86/04101

PCT Pub. Date: Jul. 17, 1986

[30] Foreign Application Priority Data

Jan. 14, 1985 [JP] Japan .................................. 60-4747
Jun. 18, 1985 [JP] Japan ............................. 60-91948[U]

[51] Int. Cl.$^5$ ........................... B32B 1/06; E02D 17/20
[52] U.S. Cl. ......................................... 428/102; 47/59;
119/3; 210/170; 405/258; 428/137
[58] Field of Search ................... 405/15, 16, 17, 19,
405/258; 428/131, 134, 136, 138; 47/59; 119/3;
210/170

[56] References Cited

U.S. PATENT DOCUMENTS

| | | | |
|---|---|---|---|
| 3,958,751 | 5/1976 | Bruno | 428/136 X |
| 4,002,034 | 1/1977 | Muhring et al. | 405/19 |
| 4,105,724 | 8/1978 | Talbot | 428/136 X |
| 4,181,450 | 1/1980 | Rasen et al. | 405/19 |
| 4,481,242 | 11/1984 | Fletcher | 428/136 |
| 4,818,579 | 4/1989 | Uchida | 428/102 |

FOREIGN PATENT DOCUMENTS

| | | |
|---|---|---|
| 55-36657 | 3/1980 | Japan . |
| 55-59224 | 5/1980 | Japan . |
| 56-16730 | 2/1981 | Japan . |
| 56-8637 | 6/1981 | Japan . |
| 57-8248 | 2/1982 | Japan . |
| 57-51117 | 11/1982 | Japan . |
| 135024 | 4/1952 | Sweden ................................ 405/19 |

Primary Examiner—David H. Corbin
Attorney, Agent, or Firm—Armstrong, Nikaido, Marmelstein, Kubovcik, & Murray

[57] ABSTRACT

The invention provides a material useful as a slope face protective material for use in civil engineering work or the like, as a water contact material or a filter material for forming biological films for use in biological water treatment by an aeration or nonaeration process, and a material for underwater nurseries for growing laver or like vegetables, artificial fish-breeding shelters, hydroponic culture beds, etc. The material includes at least one sheet having predetermined flexibility and rigidity and at least one rope attached in a wavelike form to the sheet, the sheet having a plurality of incisions which are openable when the rope is stretched from the wavelike form to deform the sheet and form a multiplicity of flaps raised with respect to the axis of the rope.

13 Claims, 6 Drawing Sheets

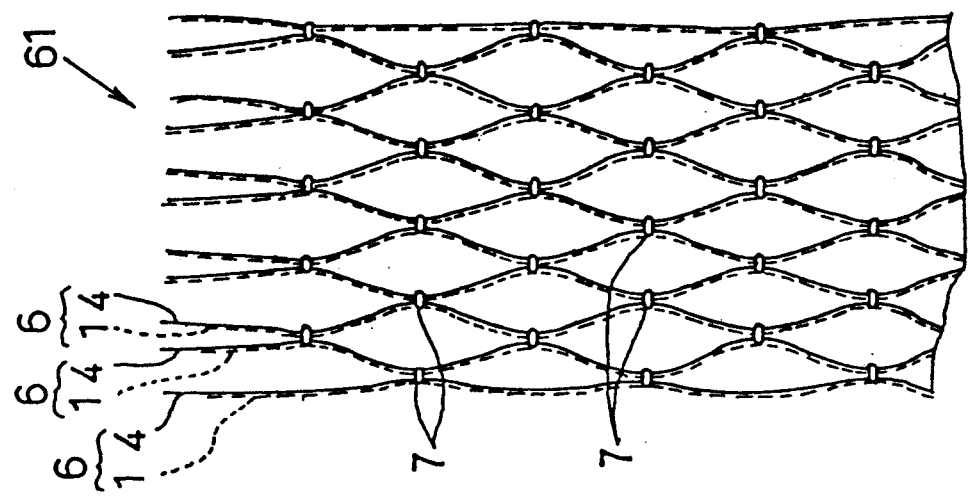
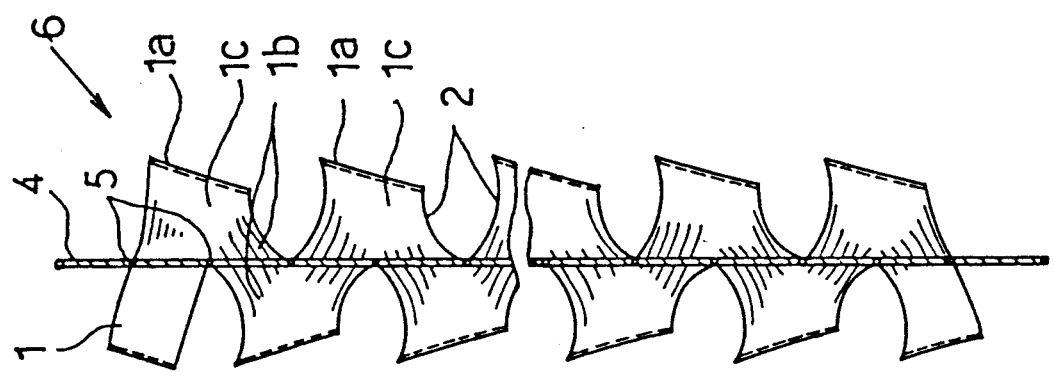
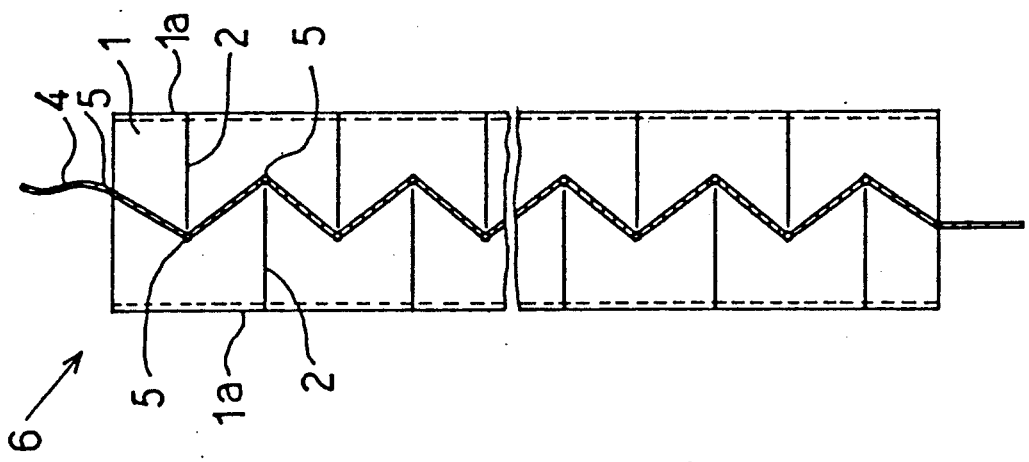

FIG. 12
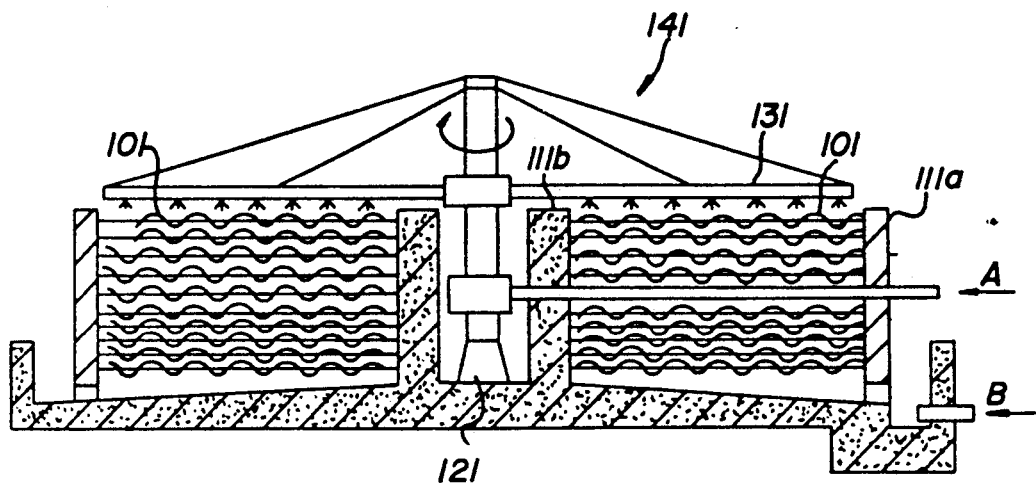
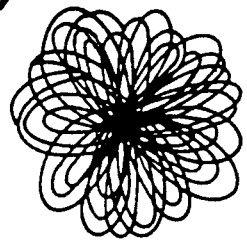
FIG. 13(a)
PRIOR ART
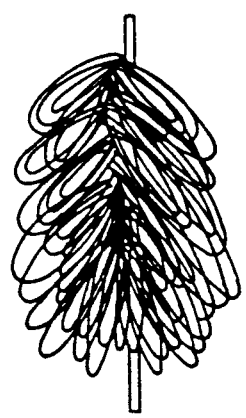
FIG. 13(b)
PRIOR ART

MATERIAL FOR PROTECTING A SLOPE SURFACE AND FOR WATER TREATMENT AND CONTACT PURPOSES

The present invention relates to materials useful as slope face protective materials for use in civil engineering work or the like, as water contact materials or filter materials for forming biological films for use in biological water treatment by an aeration or nonaeration process, and as materials for underwater nurseries for growing laver or like vegetables, artificial fish-breeding shelters, hydroponic culture beds, etc., the invention further relating to methods of preparing these materials and to a method of protecting the surface of slopes and a method of constructing slope face protective frames with use of such materials.

The slope protectors herefore used for protecting the surface of slopes include the following.

(1) Perforated semicircular steel strips assembled into circular members, which are laid over the slope as interconnnected.
(2) Reticular plates assembled into a lattice over the slope (see Unexamined Japanese Patent Publication SHO 55-36557).
(3) A netlike frame which, when stretched, forms a continuous arrangement of square meshes (see Unexamined Japanese Patent Publication SHO 56-16730).

However, these protectors have drawbacks. They are made of heavy steel plates or shaped members thereof, are bulky even before use, are inconvenient to store and transport and require much labor for assembling. Moreover, the components, i.e heavy steel plates or shaped members thereof, are also inconvenient to store and transport.

Further the conventional materials for, and methods of constructing, slope face protective frames include the following.

(a) A precast frame method wherein molded concrete members are assembled into a protective frame on the slope (Unexamined Japanese Patent Publication SHO 55-59224).
(b) A method wherein metal mesh frames and reinforcement hoops are assembled on the slope, with the frames interconnected by reinforcement rods and anchored in place when so required, followed by placement of mortar or concrete by spraying method.
(c) A method comprising arranging frames of water-resistant corrugated cardboard on the slope, interconnecting the frames by reinforcement rods and placing mortar or concrete by spraying (see Examined Japanese Patent Publication SHO 57-8248).

The precast frame method (a) requires much labor for transporting and assembling the concrete members which are heavy. With the methods (b) and (c), the frames can be arranged easily, but these methods have the drawback that the reinforcement rods must be set in place by an additional procedure which requires much labor.

Described below is the material to be brought into contact with water for forming biological films in biological water treatment by an aeration or non-aeration process. FIGS. 13 and 14 show an excellent contact material recently made available which is an arrangement of loops made of very thin vinylidene chloride thread and bundled together.

The string-like contact material has the following advantages.

(1) The loops flutter with currents of water and therefore achieve a high sewage contact efficiency.
(2) The thin thread is arranged three-dimensionally in the form of numerous loops, which retain a large quantity of microorganisms thereon with strong adhesion without readily releasing them.
(3) Being in the form of a string, the material can be installed in the sewage treating aeration tank as desired in accordance with the structure and input load of the tank.

Nevertheless, the string-like contact material has the drawback that as a progressively increasing amount of microorganisms adhere to the loops of thread, the surface of the loops become covered with a sticky substance, making the whole assembly resemble a rod as if by clogging to result in a greatly reduced area of contact.

Accordingly, a first object of the present invention is to provide a material which is lightweight, not bulky before use and therefore easy to handle, store and transport, and which is suitable for use as a slope face protective material and water-treating contact material, the material being also usable for underwater nurseries for growing laver or like vegetables, artificial fish-breeding shelters, hydroponic culture beds, etc.

A second object of the present invention is to provide a method of preparing the material with a high efficiency.

A third object of the present invention is to provide a simple and easy method of protecting the surface of slopes with use of the material.

A fourth object of the present invention is to provide a simple and easy method of constructing a slope face protective frame with use of the material.

These and other objects, features and benefits of the present invention will become apparent from a further description of the invention and the following description of embodiments of the invention (not limited by these embodiments) given with reference to the accompanying drawings, in which:

FIG. 1 is a plan view showing a material embodying the present invention:

FIG. 2 is a plan view showing the material as stretched:

FIGS. 3 to 5 are plan views showing other materials embodying the present invention;

FIG. 12 is a sectional view showing an example of aeration tank of the sprinkler type for sewage treatment wherein a material of the type shown in FIG. 1 is used as a water contact material; and FIGS. 13 and 14 are a plan view and a side elevation showing an example of conventional water contact material.

Figure 4:
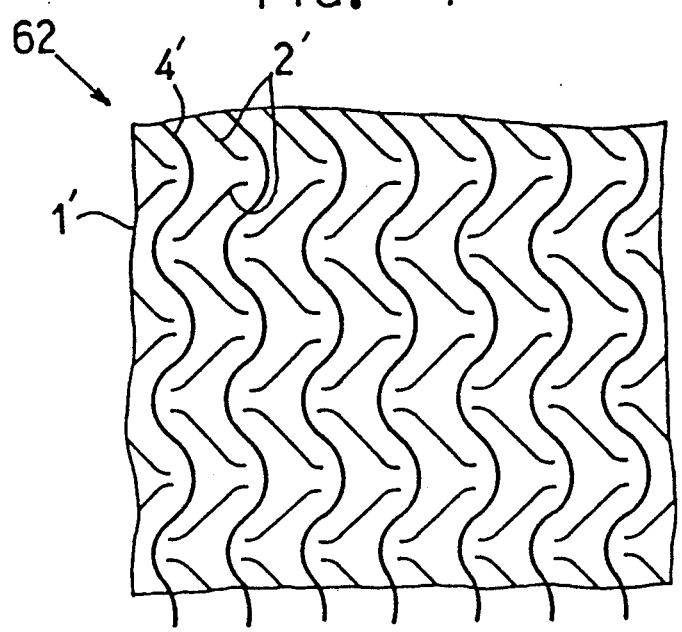

The first object of the present invention is fulfilled by a material for use as a slope face protective material or the like which includes at least one sheet having predetermined flexibility and rigidity and at least one rope attached in a wavelike form to the sheet, the sheet having a plurality of incisions which are openable when the rope is stretched from the wavelike form to deform the sheet and form a multiplicity of flaps raised with respect to the axis of the rope.

The term "incision" used herein and in the appended claims means a cutout line, punched line, cut line or the like.

Examples of useful sheets are a four-sided wide sheet, tapelike sheet, etc. when the tapelike sheet is used, the rope is positioned in a wavelike form longitudinally of the sheet and attached to the sheet, and the incision is made to extend almost to the top of each crest of the waveform of the rope from the side edge of the sheet at the base side of the crest.

Further a reticular material may be formed wherein a plurality of such tapelike sheets each having the rope and the incisions are arranged in layers, and the rope on each intermediate sheet is alternately connected at a spacing to the ropes on the sheets adjacent to the intermediate sheet at opposite sides thereof.

A plurality of ropes may be used for a single sheet, such that the ropes, each in a wavelike form, are arranged substantially in parallel with one another at a spacing and attached to the single sheet, the sheet being formed with incisions in a V-shaped arrangement, each pair of V-shaped incisions extending from the vicinity of the top of each crest of each wavelike rope almost to the tops of two crests of the wavelike rope adjacent to the base side of the crest, the two crests being positioned in front of and in the rear of the crest and oriented in a direction opposite to the direction of the crest.

The sheet may be reinforced and thereby given increased rigidity at the portions thereof providing the edges of the raised flaps to be formed when the rope is stretched.

For the reinforcement, these sheet portions are, for example, impregnated with a synthetic resin, or a reinforcement member is attached to these portions.

When the present material is to be used under light loads, for example, as a slope protective material, examples of sheets usable are waven fabric, knitted fabric, nonwoven fabric, paper sheet, such fabrics or sheet impregnated with a synthetic resin or having a synthetic resin film laminated thereto, synthetic resin sheets, synthetic resin netting, etc., and examples of useful ropes are those made of cotton, hemp or like natural fiber, Vinylon, polyamide (nylon) or like synthetic fiber, and a blend of such fibers. In any case, it is desirable that the rope be flexible and capable of extending along the surface irregularities of slopes.

When the present material is to be used under heavy loads, for example, for constructing slope face protective frames, nettings of steel or the like (including metal lathing net), such nettings coated with a synthetic resin, etc. are usable as sheets. Desirably, the sheet is capable of retaining a specified shape when stretched. Examples of useful ropes are metal wire, wire rope, metal chain, such materials coated with a synthetic resin, carbon fiber rope, etc. Preferably, the rope has high tensile strength.

When the present material is to be used as a contact material for water treatment, examples of useful sheets are woven fabric, knitted fabric, nonwaven fabric, rubber sheet, synthetic resin sheet, metal netting, etc., and examples of useful ropes are those made of natural fiber, synthetic fiber and a blend of such fibers, metal wire, etc.

When the present material is to be used for underwater nurseries for growing vegetables, artificial fish-breeding or gathering shelters, hydroponic culture beds, etc., the sheets and ropes mentioned above are also usable as suitably selected.

For whatever use the material of the present invention is contemplated, it is of course desired that the material have suitable tensile strength, rigidity, water resistance, corrosion resistance, etc. in accordance with the use.

When the material of the invention is pulled at one end of the rope with the other rope end fixed, the sheet is subjected to a force acting to deform the sheet so that the top portions of the wavelike form of the rope on the sheet are positioned on a straight line, whereby the incisions are opened to bend the sheet and form flaps raised with respect to the axis of the rope (hereinafter referred to as "raised flaps") between the incisions in the sheet. When the material of the present invention is used for protecting the surface of slopes or for constructing slope face protective frames, the sheet thus deformed serves the function of supporting the borrow (soil) placed thereon or the mortar or the like applied thereto chiefly by the raised flaps and also transmitting the load to the rope, while the rope supports the load. In this way, the present material performs the two functions required of such slope face protective material or protective frame constituent material. In this case, therefore, the sheet needs only to have strength sufficient for each flap to retain the borrow or the like between one incision and the next incision and rigidity to prevent the flap from falling by the placement of borrow or spraying, while the rope needs only to have such tensile strength as to support the weight of the borrow, mortar or the like delivered thereto through the sheet. Each of the rope and the sheet can accordingly be of a material suited to the function required thereof, with the result that the present material can be made in its entirety lightweight and less bulky in a flat form before stretching for facilitated storage, transport and handling.

For use as a contact material for forming biological films for biological water treatment, the material of the present invention has the same advantages as the conventional contact material already described. Microorganisms adhere to the surfaces of the sheet, and the raised flaps individually flutter with currents of sewage, permitting the present material to achieve a high sewage contact efficiency. An increase in the amount of deposition of microorganisms produces little or no change in the contact surface area of the sheet and therefore results in no reduction in the contact efficiency. Furthermore, the contact material is installable in the water treating aeration tank or the like as desired in accordance with the load.

When the material of the present invention is to be used as a sewage contact material or for underwater nurseries for growing vegetables, artificial fish-breeding or gathering shelters, hydroponic culture beds or the like, suitable materials are selectable for the sheet and the rope so that the present material can be made in its entirety lightweight, flat and less bulky before use, and therefore easy to store, transport and handle.

In the case of the material comprising a plurality of tapelike sheets and ropes connected together into a reticular structure, the sheets form raised flaps when the ropes are stretched, and the material is unfoldable into a meshwork when stretched transversely of the ropes.

The material comprising a plurality of ropes attached as arranged in parallel to a sheet formed with V-shaped incisions forms a multiplicity of raised flaps over the entire sheet when the ropes are stretched. When this type of material is used for protecting the surface of slopes or for constructing slope face protective frames, it is desirable to use the material with the ropes extending horizontally.

The second object of the present invention can be filfilled by a method of preparing a material for use as a slope face protective material or the like including the steps of attaching to a sheet a plurality of ropes extending each in a wavelike form in a predetermined direction and arranged at a spacing, cutting the sheet into tapelike pieces with each of the ropes positioned centrally of each piece, and making in each of the tapelike pieces incisions each extending almost to the top of each crest of the waveform of the rope from the side edge of the piece at the base side of the crest. (Either one of the cutting step and the incising step may precede the other.) Alternatively, the object can be achieved by a method of preparing a material for use as a slope face protective material or the like including the step of arranging a plurality of tapelike sheets in layers at a spacing from one another, each of the tapelike sheets having attached thereto a rope extending in a wavelike form longitudinally of the sheet and being formed with incisions each extending almost to the top of each crest of the wavelike form of the rope from the side edge of the sheet at the base side of the crest, and the step of feeding the sheets intermittently a specified distance at a time and attaching at a position the rope on each of the intermediate sheets to the rope on the sheet adjacent to the intermediate sheet at one side thereof during every stationary intervening period while attaching at a position one-half the distance away from the position the rope on each of the intermediate sheets to the rope on the sheet adjacent to the intermediate sheet at the other side thereof.

In either of these methods, the rope is attached to the sheet by stitching, knitting, adhesion, welding, fastening with fasteners or some other method in accordance with the materials of the rope and sheet. The rope may be attached over the entire length thereof to the sheet or only at the top portions or crests of the wave form of the rope in accordance of the strength required of the joint.

The material can be produced by the former method efficiently since the step of attaching the rope to the sheet, the step of incising the sheet and the step of cutting the sheet can be executed in sequence.

The latter method produces a reticular material easily and efficiently. The latter method can be practiced subsequent to the former method. The reticular mterial can then be produced with a further improved efficiency.

The third object of the present invention can be fulfilled by a method of protecting the surface of a slope with use of at least one piece of a material including at least one sheet having predetermined flexibility and rigidity and at least one rope attached in a wavelike form to the sheet, the sheet having a plurality of incisions which are openable when the rope is stretched from the wavelike form to deform the sheet and form a multiplicity of flaps raised with respect to the axis of the rope, by laying the material over the slope surface with the rope in a stretched state and anchoring the material to the slope surface. The material and the slope surface are further covered with a covering material when required.

The fourth object of the invention is achieved by a method of constructing a slope face protective frame with use of at least one piece of a material including at least one sheet having predetermined flexibility and rigidity and at least one rope attached in a wavelike form to the sheet, the sheet having a plurality of incisions which are openable when the rope is stretched from the wavelike form to deform the sheet and form a multiplicity of flaps raised with respect to the axis of the rope, by laying the material over a slope surface with the rope in a stretched state, anchoring the material to the slope surface and subsequently enclosing the material with a covering material.

In the case of either of these slope face protecting method or the frame constructing method, the sheet of the material is, for example, a tapelike sheet, and the rope extends in a wavelike form longitudinally of the sheet and is attached to the sheet, the incisions each extending almost to the top of each crest of the wavelike form of the rope from the side edge of the sheet at the base side of the crest, and a plurality of pieces of the material are laid over the slope with the ropes stretched and forming a meshwork on the slope. All or some of the intersections of the pieces of material can be anchored to the slope surface. Alternatively, the material comprises a plurality of tapelike sheets each having the rope attached thereto and extending in a wavelike form longitudinally of the sheet, the incisions each extending almost to the top of each crest of the wavelike form of the rope from the side edge of the sheet at the base side of the crest, the tapelike sheets being arranged in layers with the rope on each intermediate sheet alternately connected at a spacing to the ropes on the sheets adjacent to the intermediate sheet at opposite sides thereof to form a reticular structure. At least one piece of this material is stretched in the form of a netting over the slope with the ropes stretched, and all or some of the connections of the ropes are anchored to the slope surface.

The method may further be practiced by preparing a plurality of pieces of the material wherein the sheet is a tapelike sheet and the rope extends in a wavelike form longitudinally of the sheet and is attached to the sheet, the incisions each extending almost to the top of each crest of the wavelike form of the rope from the side edge of the sheet at the base side of the crest, connecting at least one piece of the material to each of a plurality of anchors, laying the connected pieces of material on the slope, fixing the anchors in the slope and interconnecting the free ends of the anchored pieces of the material in a specified combination.

The method may further be practiced using at least one piece of the material wherein a plurality of ropes, each in a wavelike form, are arranged substantially in parallel with one another at a spacing and attached to the single sheet, the sheet being formed with incisions in a V-shaped arrangement, each pair of V-shaped incisions extending from the vicinity of the top of each crest of each wavelike rope almost to the tops of two crests of the wavelike rope adjacent to the base side of the crest, the two crests being positioned in front of and in the rear of the crest and oriented in a direction opposite to the direction of the crest. The material is laid over the slope surface and anchored thereto with the ropes arranged substantially horizontally in a stretched state.

For the protection of slopes, the covering material is preferably, for example, at least one of mortar and concrete, which is placed over the material and the slope by spraying once or dividedly several times.

Borrow (which may contain a soil hardening agent), the combination of borrow and a plant, or the like may be used in place of mortar or concrete. The covering material for constructing the slope face protective frame is, for example, at least one of mortar and concrete, which is applied to the present material and the slope, preferably by spraying or coating once or dividedly several times.

In either method of protecting the surface of slopes or constructing frames according to the invention, the sheet forms raised flaps between the incisions when the rope is stretched. When the slope surface has irregularities due to projections, the sheet is bent by contact therewith to extend along the slope surface. When the irregularity is an indentation, the sheet in a raised form enters the indentation.

When there is no need to apply the covering material to the present material and the slope surface to be protected, the present material may be merely laid and anchored. In this case, the present material supports and retains soil.

When soil is to be placed over the slope surface to be protected by the method of the invention, soil is spread or otherwise placed over the slope after installing the present material until the sheet is almost completely embedded in the soil. The sheet retains the soil with its raised flaps, and the rope supports the weight of the soil delivered thereto through the sheet. When the present material is installed in intersecting directions in a double (meshwork) arrangement, the material exhibits enhanced soil retaining ability.

When the slope surface provided with the present material as anchored thereto is planted with trees after or when soil is placed thereover, removal of soil by scour can be prevented until the trees grow up.

When the slope surface provided with the protective material is entirely covered with concrete or mortar by spraying, the sheet of the protective material adheres to the mortar to retain the mortar firmly over a wide area.

With the method of constructing slope face protective frames according to the invention, the sheet which is a component of the present material serves as a form for retaining mortar or the like over a wide area when it is sprayed. After the completion of the frame, the sheet functions as a transverse reinforcement, while the rope serves as a longitudinal reinforcement for supporting the weight of the concrete. The rope extends over a large distance and therefore affords strength. The rope is not prone to corrosion since it is held at a level above the slope surface and completely covered with concrete.

For use on a slope surface of acid soil, the present material is coated with a synthetic resin or made of corrosion-resistant substances to avoid corrosion. A protective frame of increased height can be constructed by installing the present material in two layers.

The present material can be installed on the slope surface very easily by the slope face protection method and the frame constructing method of the invention, while the covering material is applicable to the slope surface and/or the present material in the same manner as conventionally done, so that the slope surface can be protected more readily than heretofore possible.

Embodiments of the present invention will be described next with reference to the accompanying drawings.

FIGS. 1 and 2 show a material embodying the invention. A sheet 1 is made of a thick nonwoven fabric having a width of 10 to 20 cm and a length of 10 to 50 m. A rope 4 of Vinylon extends in a triangular wave form and is attached to the sheet by adhesion or stitching at the top portions or crests of the wave form. The sheet 1 is formed with incisions 2 extending alternately from opposite side edges of the sheet inward. The incision extends from the side edge at the base side of each crest of the triangular wave form of the rope 4 almost to the top of the crest. Each side edge of the sheet 1 has a reinforced portion 1a formed by impregnating the edge with a synthetic resin, followed by curing, or by adhering or stitching a reinforcement member to the edge, whereby the edge is given enhanced rigidity.

When the rope 4 of the material 6 thus constructed is stretched straight by pulling one end with the other end fixed, the sheet 1 opens at the incisions 2 and deforms to bend in the vicinity of the joints 5 at the top portions of the wave form where the rope 4 is attached as seen in FIG. 2, forming raised flaps 1c between the incisions with the reinforced portions 1a raised with respect to the axis of the rope 4. The reinforced portions 1c give the raised flaps 1c increased rigidity and enhanced strength to withstand the weight of soil or the like placed thereon, whereas the reinforced portions are not always needed when the sheet 1 itself has sufficient rigidity.

FIG. 3 shows another embodiment of material. This material 61 comprises pieces of the tapelike material 6 shown in FIG. 1 and arranged in layers, with the ropes interconnected at a suitable spacing into a reticular structure so as to form a continuous arrangement of quadrilaterial meshes when the material is stretched transversely with the ropes also stretched. Stated in greater detail, the material 61 comprises a plurality of pieces of the material 6 shown in FIG. 1 as arranged in layers. The rope 4 of each intermediate piece 6 is alternately attached at a spacing to the ropes 4 of the pieces 6 adjacent to the intermediate piece at opposite sides thereof. The attaching means is, for example, a C-shaped fastener, which is tightly wound around two ropes to firmly connect them together. Indicated at 7 are the connections.

FIG. 4 shows a material 62 of another embodiment. The material comprises a sheet 1' for example of a synthetic resin and ropes 4' for example of nylon arranged at a spacing and adhered to the sheet 1', each of the ropes 4' being in a wave form having ciruclar arc crests. Between the ropes, the sheet is formed with incisions 2' in a V-shaped arrangement, each pair of V-shaped incisions extending from the vicinity of the top of each crest of each wavelike rope almost to the top portions of two crests of the wavelike rope adjacent to the base side of the crest, the two crests being positioned in front of and in the rear of the crest. When the material 62 is stretched by pulling one end of each rope 4' with the other rope end fixed, the incisions 2' open, forming raised flaps in parallel with the axes of the ropes 4' over the entire area of the sheet as in the case of the material of FIG. 1.

The side edges of the incisions 2' can be reinforced, like the material shown in FIG. 1, to give enhanced rigidity to the edge.

Figure 5:
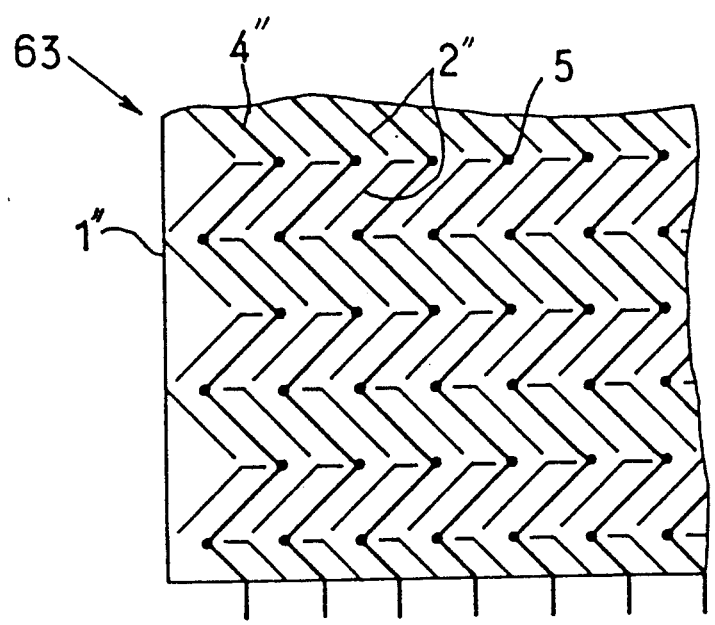

FIG. 5 shows a material 63 formed by incorporating ropes 4" into a sheet 1" by a Raschel knitting machine. The sheet 1" is knitted of stiff yarns, while thick cotton threads or the like are used as the ropes 4"', which are attached to the sheet 1" at joints 5 by knitting. Like the material of FIG. 4, the sheet is formed with incisions 2" in a V-shaped arrangement, each pair of V-shaped incisions 2" extending from the vicinity of the top of each crest of each wavelike rope almost to the top portions of two crests of the wavelike rope adjacent to the base side of the crest, the two crests being positioned in front of and in the rear of the crest.

When the sheet is made of a material having low stiffness, the sheet is impregnated with a thermosetting synthetic resin, followed by curing, or impregnated with a thermoplastic synthetic resin, to give such rigidity that the sheet 1" can remain in shape when the ropes are stretched.

Figure 6:
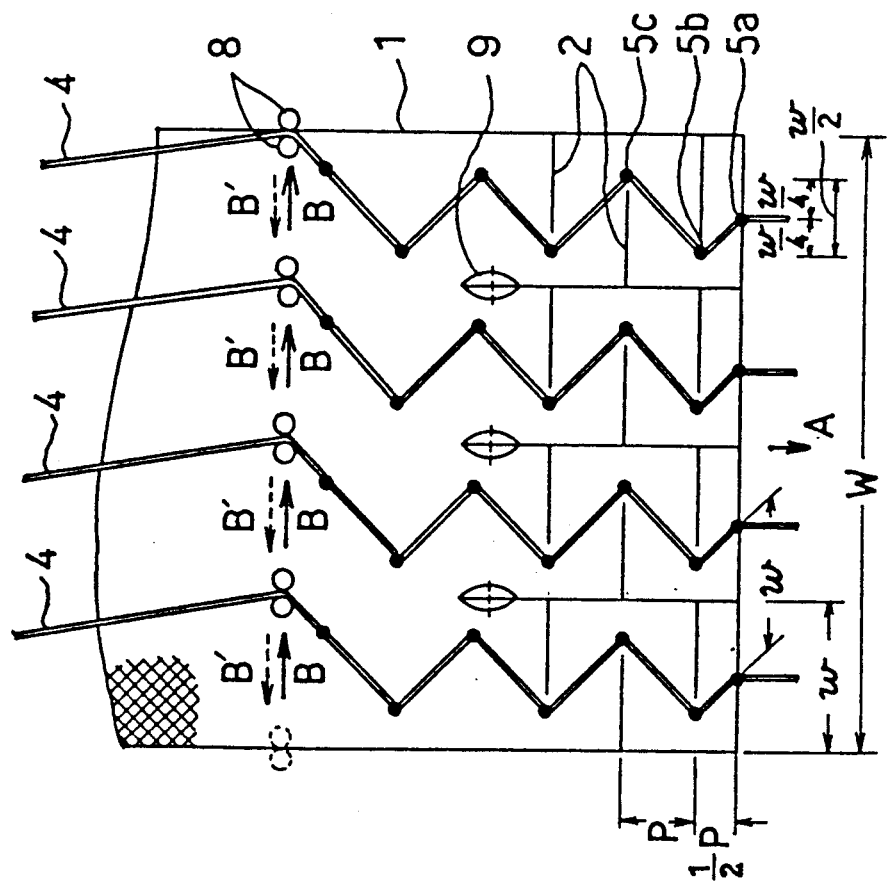
FIG. 6 is a plan view for illustrating a method of preparing a material of the type shown in FIG. 1.

FIG. 6 shows an example of method of preparing a tapelike material using a steel mesh sheet having a width W as the sheet 1 and steel wires as the ropes 4.

First, a portion of each rope 4 at a distance from its start end is welded to one end 5a of the sheet 1 by an unillustrated welding device. Next, each rope 4 is clamped by shift members 8 and shifted a distance of w/4 leftward in the direction of arrow B, B' to a specified position. (The shift members 8 at the left edge of the sheet are shown in broken lines.) The sheet 1 is advanced ½ of a specified distance P (P/2) in the direction of arrow A. At the same time, the unillustrated welding device is shifted a distance of w/4 leftward, and the rope 4 is welded to the sheet 1 at a joint point 5b. Next, the sheet 1 is advanced the specified distance P in the direction of arrow, each pair of shift member 8 is shifted the distance of w/2 in the direction of arrow B to a specified position (indicated in solid lines), and at the same time, the welding device is also shifted by w/2 rightward to weld the rope to the sheet at a joint point 5c. This procedure is repeated to weld the ropes 4 to the sheet 1, each as arranged in a triangular wave form. When the sheet 1 has been advanced in the direction A to a position, a slitter 9 starts to cut the sheet 1 into pieces having a width w. Subsequently, an unillustrated slitter successively makes incisions 2. When the ropes 4 are completely welded to one sheet 1, another sheet 1 is supplied. When a pretermined length of each rope has been welded, the rope is cut off at a distance from its terminal end. In the present case, four pieces of tape-like material are obtained.

Figure 7:
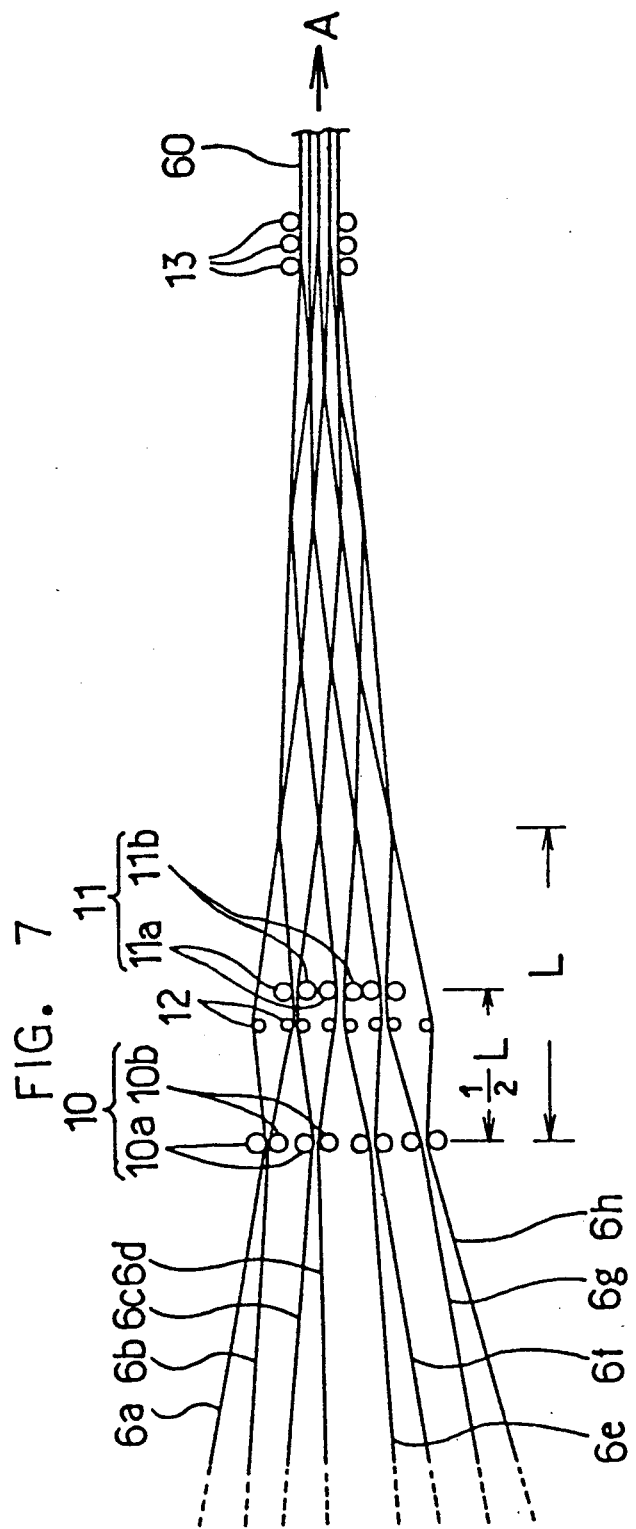
FIG. 7 is a plan view for illustrating a method of preparing a material of the type shown in FIG. 3.

FIG. 7 shows an example of method of preparing a material 60 of the type shown in FIG. 3 by joining together eight pieces of tapelike material 6a to 6h. Each of the pieces 6a to 6h comprises a steel netting as the sheet and a steel wire as the rope. The pieces are arranged at a suitable spacing at the left of the drawing and are transported by unillustrated means in the direction of arrow A intermittently a specified distance L at a time so as to be fitted together in layers by guide rollers 13 at the right of the drawing. First and second welding devices 10 and 11 serving as attaching means are arranged at an intermediate portion of the path of transport and are spaced apart by ½ of the distance (L/2). The first welding device 10 has openable and closable pairs of welding electrodes 10a and 10b to weld the ropes on the pieces 6a and 6b, 6c and 6d, ..., 6g and 6h every time the pieces 6a to 6h are advanced the distance L in the direction of arrow A. The second welding device 11 has welding electrodes 11a and 11b which are openable and closable and also movable upward and downward in directions perpendicular to the plane of the drawing. Opening members 12, which are similarly openable and closable and movable upward and downward, shift the pieces so that the adjacent pieces 6b and 6c, ..., 6f and 6g will contact each other after passing the first welding device 10. The electrodes 11a and 11b of the second welding device 11 are inserted into the spaces thus widened and weld the adjoining pieces at points a distance of L/2 away from the welds formed by the first device 10. The eight pieces of material 6a to 6h are connected together into a reticular structure by welding the pieces in this way every time they are advanced the distance L in the direction of arrow A.

While the material 60 prepared by the above example of method comprises steel netting and steel wires, the components are not limited to these materials. Further while rope attaching means suited to the material of the rope is of course used, widely useful means include, for example, a C-shaped steel fastener for tightly fastening two ropes together by being wound therearound.

Figure 8:
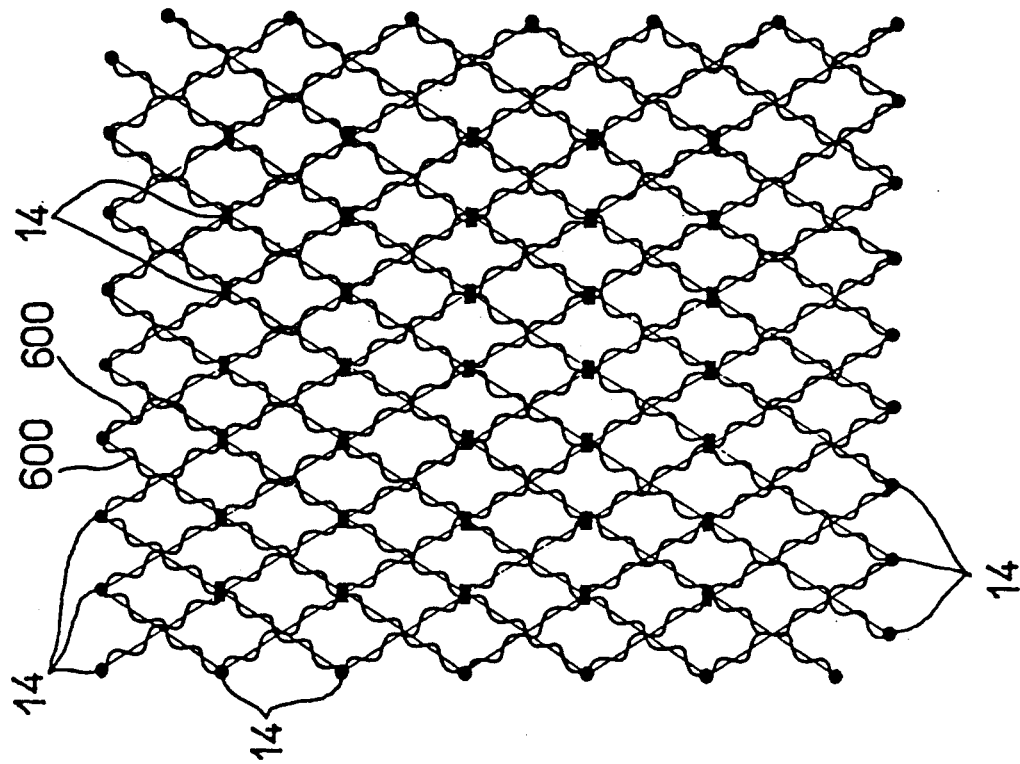
FIG. 8 is a diagram for illustrating a method of protecting a slope surface with use of a material of the type shown in FIG. 1.

FIG. 8 shows an exemplary mode of a slope face protection wherein a material of the type shown in FIG. 1 is used as a slope face protective material. Pieces of tapelike protective material 600 of the type shown in FIG. 1 are stretched and laid in an intersecting pattern. The form of the protective material is shown as simplified. To install the protective material in place, anchors 14 are first placed into the slope along the top end, bottom end and side end of the slope, as arranged at a specified spacing. Next, pieces of the protective material 600 are laid over the slope one after another by causing the pieces to extend obliquely crosswise in a stretched state. Subsequently, anchors 14 are placed into the slope surface at a number of intersections of the pieces 600 at a suitable spacing, and the ropes 4 are fastened to the anchors. At locations where the protective material is raised above the slope surface due to surface irregularities, anchors are similarly implanted to cause the material to extend along the slope surface. Soil is then placed over the slope to such an extent that the protective material is embedded in the earth. The soil covering is pressed for finishing.

When the reticular protective material of the type shown in FIG. 3 is used, the result obtained is the same as when pieces of protective material shown in FIG. 1 are laid in a similar meshwork arrangement. Further protective sheets of the type shown in FIGS. 4 and 5 can be installed in the same manner as in the above embodiment except that the ropes 4 are made to extend horizontally over the slope.

Mortar or concrete is applied by spraying when to be used in place of soil for covering the slope.

Figure 10:
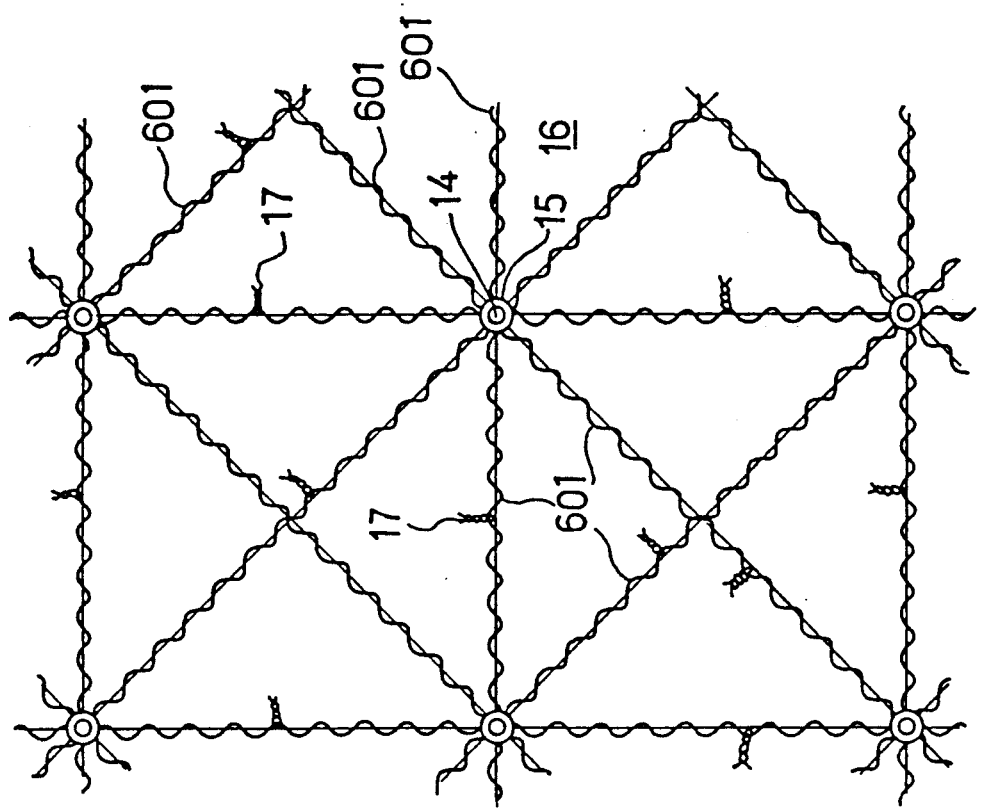
FIG. 10 is a diagram showing the protective material of FIG. 9 as installed.
Figure 9:
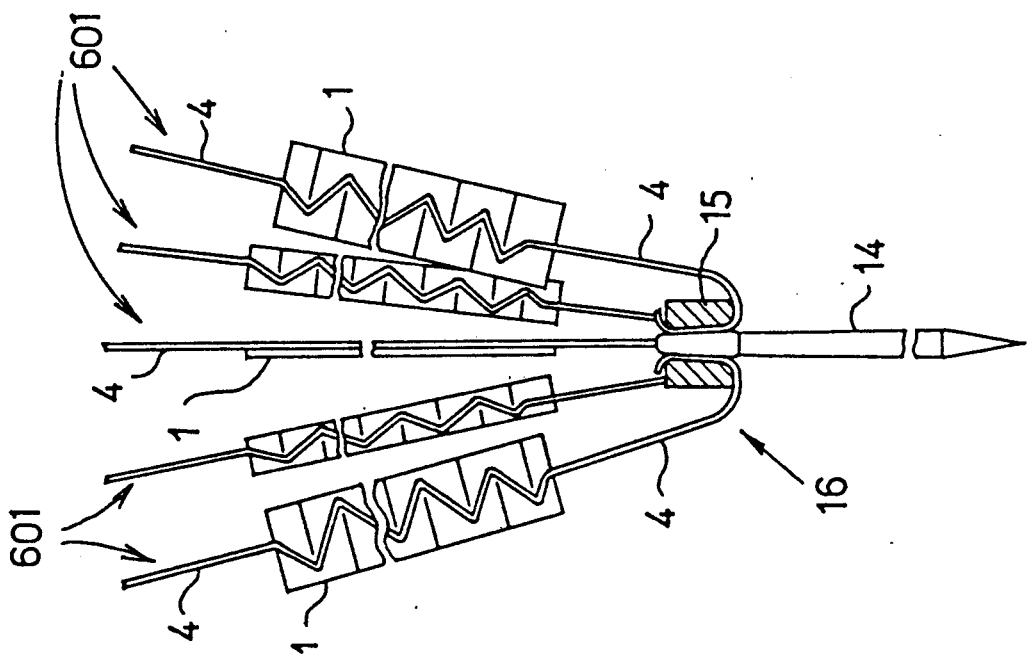
FIG. 9 is a slide elevation showing a slope face protective material provided with an anchor.

FIGS. 9 and 10 are diagrams for illustrating another method of slope face protection. FIG. 9 shows pieces of tapelike protective material as fastened to one end of an anchor. FIG. 10 shows the protective material of FIG. 9 as installed over a slope using anchors. With reference to these drawings, the ropes 4 of some pieces (eight pieces in the present case) of protective material 601 are attached, each at its one end, to the rear end of the anchor 14 by a fastener 15 to fabricate a member 16.

The slope surface is protected using such members 16 by implanting the anchors at a suitable spacing and interconnecting the pieces of protective material 601 of the adjacent members 16 as shown in FIG. 10. For connection, the ropes 4 are tied or fastened by a member when they are soft, or are twisted together when they are steel wires or the like. Indicated at 17 are the connections.

After all the pieces of protective material 601 have been thus connected together, soil is placed over the slope or mortar is sprayed thereto in the same manner as in the foregoing embodiment.

Each piece of protective material used in this embodiment has a short length of several meters, so that the material can be made to extend along the slope surface even if the slope surface has marked surface irregularities.

The member (protective material having anchor) described above is usable also for the frame constructing method to be described below.

An example of method of constructing a slope face protective frame according to the invention will be described.

A tapelike protective material of the type shown in FIG. 1 is used in which the sheet 1 is a steel mesh sheet, 10 to 20 cm in width and 1 to 2 mm in thickness, and the rope 4 is a steel wire 6 to 8 mm in diameter. Pieces of the material are laid over a slope as extended obliquely from above downward and arranged at a spacing of 1 to 3 cm, and pieces of the material are extended to intersect the first-mentioned pieces as arranged at the same spacing to form over the entire slope a reticular arrangement with quadrilateral meshes. The protective material, which is rigid in this case, is stretched using winch or the like. When stretched, the sheet of the protective material undergoes plastic deformation and retains its shape, so that when such pieces of material are to be laid in an intersecting pattern, the material is stretched at some other place before installation in place. The intersections of the pieces of material are then firmly fixed to the slope by anchoring. Subsequently, mortar or concrete is applied by spraying several times at a suitable time interval to enclose the entire protective assembly with mortar or concrete. The covering is finished using a trowel when required.

Figure 11:
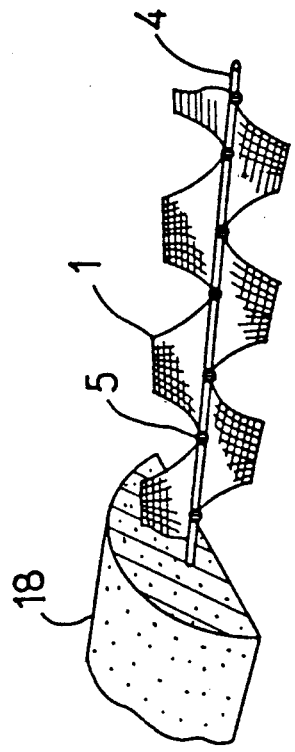
FIG. 11 is a perspective view partly broken away and showing a concret slope face protective frame constructed with use of a material of the type shown in FIG. 1.

FIG. 11 is a perspective view partly broken away and showing a portion of the protective frame thus constructed. In FIG. 11, indicated at 1 is the sheet, at 4 the rope, at 5 the joint and at 18 the concrete frame.

A similar frame can of course be constructed using a reticular protective material of the type shown in FIG. 3.

The material of the present invention is useful also as a contact material for water treatment as will be described below with reference to FIG. 12, which shows an example of water treating aeration tank of the sprinkler type. In FIG. 12, indicated at 101 are strips of water contact material. Indicated at 111a is an outer retaining wall serving as the outer peripheral wall of the tank, at 111b an inner retaining wall accommodating a rotating device 121, and at 131 a sprinkler pipe. The strips of contact material 101 extend horizontally between the retaining walls 111a, 111b, provided in layers and arranged nearly equidistantly circumferentially of the tank.

The contact material 101 is a tapelike material of the type shown in FIG. 1, in which the sheet is a tape of nonwoven fabric and the rope is made of polyamide (nylon). The strips of contact material are installed in the aeration tank with their ropes stretched.

The sewage discharged from the sprinkler pipe 131 and applied to the strips of contact material 101 providing a filtration bed 141 flows down along the surfaces of the strips 101.

The filtration bed 141 thus composed of strips of contact material 101 are easy to clean or replace, is given the desired specific surface area, void ratio, etc. and permits the sewage to contact the strips of contact material 101 with high efficiency when flowing down since the inclined flaps 6d, etc. of the strips 101 are movable.

I claim:

1. A material including at least one sheet having predetermined flexibility and rigidity and at least one rope extending in a wavelike form longitudinally of the sheet and attached to the sheet, the sheet having a plurality of incisions with each incision extending from a side edge of the sheet at a base side of a crest of the wavelike form of the rope to a location adjacent the top of said crest and said rope being attached to said sheet at least at the top of each of said crests opposite one of said incisions, so that when the rope is stretched along its longitudinal axis the sheet deforms to open the incisions and form a multiplicity of flaps raised with respect to the axis of the rope.

2. A material as defined in claim 1 wherein a plurality of said sheets are provided in tapelike form with each having a rope attached thereto and a plurality of incisions, said sheets are arranged side by side and the rope attached to each sheet intermediate a pair of adjacent sheets is alternately connected at spaced intervals to the ropes on the adjacent sheets at opposite sides of the intermediate sheet to form a reticular pattern.

3. A material including a sheet having predetermined flexibility and rigidity and a plurality of ropes attached to the sheet, each of said plurality of ropes being attached to said sheet in a wavelike form and arranged in a spaced, substantially parallel relation with the other said ropes, a plurality of pairs of incisions between spaced adjacent ones of said ropes, each pair of incisions forming a V-shaped pattern and each pair of V-shaped incisions extending from the vicinity of the top of a crest of a first wavelike formed rope almost to the tops of two oppositely oriented crests of a second, adjacent wavelike formed rope and said ropes being attached to said sheet at least at a point of each said crest opposite one of said incisions, so that when the ropes are stretched along their longitudinal axes the sheet deforms to open the incisions and form a multiplicity of flaps raised with respect to the axis of each rope.

4. A material as defined in claim 1 or claim 3 wherein the portions of the sheet providing the edges of the raised flaps formed when the rope is stretched are reinforced to provide increased rigidity.

5. A material as defined in claim 4 wherein said portions of the sheet are reinforced by impregnating said portions with a synthetic resin.

6. A material as defined in claim 4 wherein said portions of the sheet are reinforced by attaching a reinforcement member to said portions thereof.

7. A material as defined in claim 1 or claim 3 wherein the sheet is selected from among woven fabric, knitted fabric, nonwoven fabric, paper sheet, said fabrics or sheet impregnated with a synthetic resin or having a synthetic resin film laminated thereof, rubber sheet, synthetic resin sheet, synthetic resin netting, metal netting and metal netting coated with a synthetic resin.

8. A material as defined in claim 1 or claim 3 wherein the rope is selected from among a rope made of a natural fiber, a synthetic fiber, carbon fiber or a blend of at least two of said fibers, metal wire, wire rope, metal chain, said metal wire, wire rope and metal chain coated with a synthetic resin, and synthetic resin chain.

9. A material as defined in claim 1 or claim 3 for use as a slope face protective material.

10. A material as defined in claim 1 or claim 3 for use as a contact material for water treatment.

11. A material as defined in claim 1 or claim 3 for use as an underwater culture bed for growing vegetables.

12. A material as defined in claim 1 or claim 3 for use as an artificial fish-breeding or -gathering shelter.

13. A material as defined in claim 1 or claim 3 for use as a hydroponic culture bed.

* * * * *